July 8, 1924.
J. BROCKLEY
1,500,544
ARTICLE CARRIER AND DISPLAY DEVICE
Filed Oct. 18, 1922   2 Sheets-Sheet 1
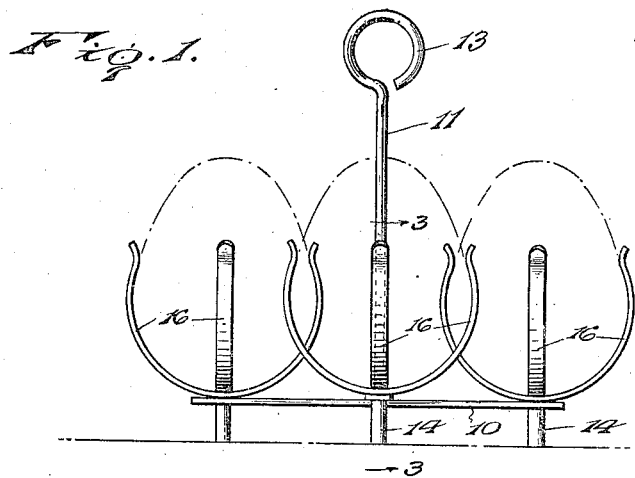
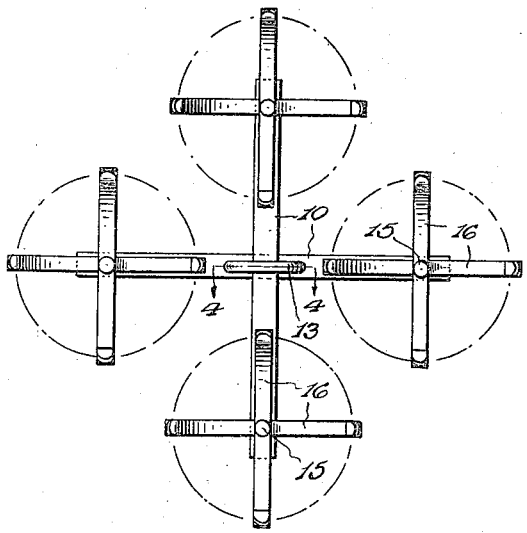
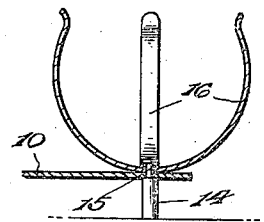
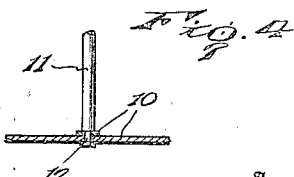
Inventor
Jacob Brockley.
By Lacey & Lacey, Attorneys

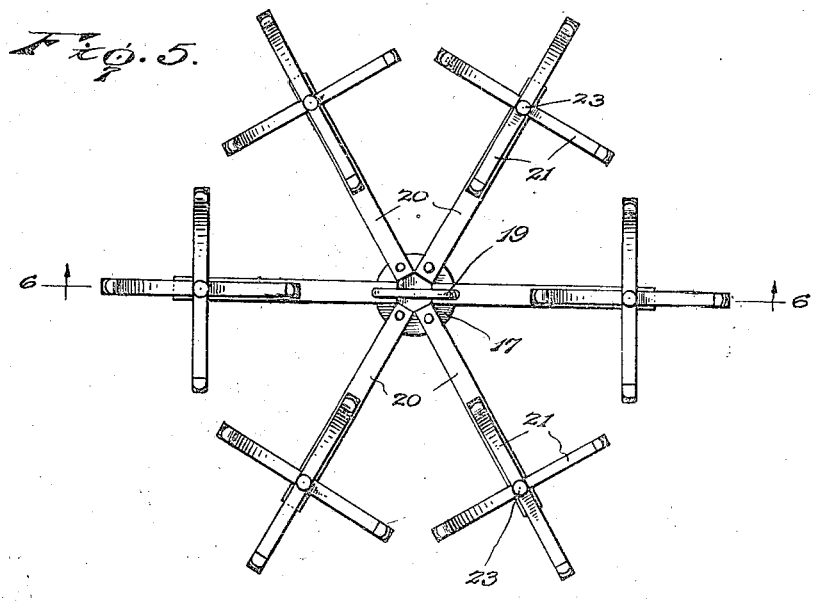
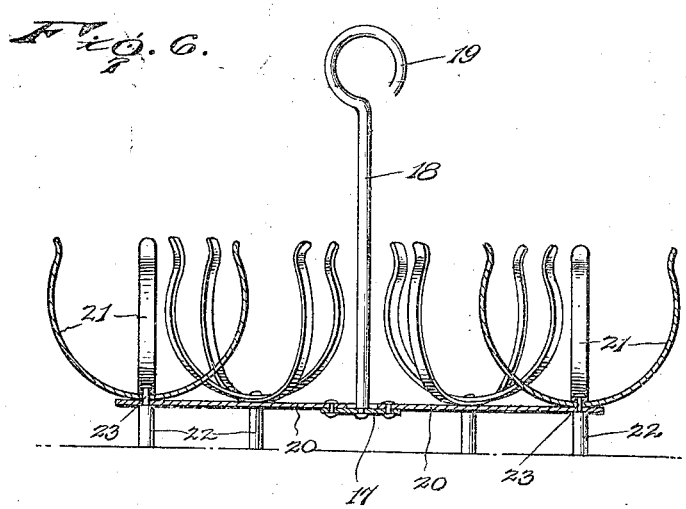

Patented July 8, 1924.

1,500,544

UNITED STATES PATENT OFFICE.

JACOB BROCKLEY, OF NEWPORT NEWS, VIRGINIA.

ARTICLE CARRIER AND DISPLAY DEVICE.

Application filed October 18, 1922. Serial No. 595,330.

*To all whom it may concern:*

Be it known that I, JACOB BROCKLEY, citizen of the United States, residing at Newport News, in the county of Warwick and State of Virginia, have invented certain new and useful Improvements in Article Carriers and Display Devices, of which the following is a specification.

This invention relates to an improved article carrier and display device and seeks, as one of its principal objects, to provide a simple and efficient device for holding, carrying or displaying small objects such as eggs, drinking glasses bottles and jars, flower pots, small cans, packages containing food, drugs or the like, and, in fact, all small articles of commercial and household use having a cylindrical, round, oval or other similar general shape.

A further object of the invention is to provide a device which will be convenient, simple, durable and inexpensive and which will greatly facilitate the supporting, handling and displaying of articles of the character indicated and arranging them in small units or groups for handling in the home or place of business or for display to best advantage when so desired.

A further object is to provide a device which will be compact and which may be rested upon a horizontal surface or suspended if so desired.

And the invention has as a still further object to provide a device wherein the articles to be arranged thereon may be easily engaged with the device or removed therefrom and which will involve a structure light in weight and admitting of practically all portions of the articles thereon being observed, the latter feature being of special advantage when the device is used for display purposes.

Other and incidental objects will appear hereinafter.

In the drawings:

Figure 1 is an elevation of my improved device.

Figure 2 is a top plan view of the device.

Figure 3 is a detail section on the line 3—3 of Figure 1, looking in the direction of the arrows.

Figure 4 is a detail section on the line 4—4 of Figure 2, looking in the direction of the arrows.

Figure 5 is a plan view showing a slight modification of the invention, and

Figure 6 is a sectional view on the line 6—6 of Figure 5, looking in the direction of the arrows.

In carrying the invention into effect, I employ crossed resilient arms 10 which are arranged at substantially right angles to each other and may be formed of sheet metal or other approved material. Upstanding from the arms is a stem 11 provided at its lower end, as particularly shown in Figure 4, with a reduced stud 12 extending through the arms at their intersection and upset for rigidly connecting the arms. The stem may, if desired, be formed from a piece of suitable resilient wire and, as best brought out in Figure 1, the stem is bent at its upper end to define a terminal finger loop 13. Depending from the arms 10 near their outer ends are spacing elements or legs 14 provided at their upper ends with reduced studs 15 extending through the arms and mounted upon the arms at their upper sides is a plurality of holders each comprising crossed clamping members 16, the studs 15 of the legs extending through said members at their intersection and being upset for rigidly connecting the holders with the arms. The clamping members 16 are, as will be observed, preferably substantially semi-circular, being arranged at right angles to each other, and may be formed of resilient metallic strips, wire, or the like.

As will now be seen, various articles may be readily engaged in the holders of the device to be gripped by the clamping members 16 of the holders so that said articles will be firmly held upon the device. Accordingly, by grasping the finger loop 13 of the stem 11, the device may be readily carried about without fear of dislodging the articles. Furthermore, said loop will also provide a convenient means whereby, if so desired, the device may be readily suspended. However, the legs 14 of the body are employed in order that the device may be rested upon a flat surface and, in this connection, it is to be noted that the device is eminently adapted for supporting canning jars in a suitable boiler when the legs will serve to space the jars from the bottom of the boiler to prevent possible cracking of the jars due to unequal heat distribution. Similarly, the device may be employed in boiling eggs or may be used for displaying various small articles of merchandise in a store window or the like.

In Figures 5 and 6 of the drawings, I have illustrated a slight modification of the invention wherein I employ a disc-shaped center plate 17. Upstanding from this plate is a stem 18 provided at its upper end with a loop 19 and radiating from the plate is a plurality of arms 20 riveted or otherwise secured at their inner ends to the plate. These arms correspond to the arms 10 of the preferred construction and mounted upon the arms at their outer ends are a plurality of holders comprising crossed clamping members 21 corresponding to the clamping members 16 of the prior embodiment of the invention. Depending from the arms are spacing elements or legs 22 provided at their upper ends with reduced studs 23 extending through the arms and through the clamping members 21 connecting said members with the arms as well as securing the legs in position, the legs 22 thus corresponding to the legs 14. As will be seen, this modified structure also provides a very simple and efficient device while being capable of holding a greater number of articles than the device of the preferred construction.

Having thus described the invention, what is claimed as new is:

1. As a new article of manufacture, an article carrier including companion arms, crossed substantially semi-circular resilient clamping members disposed near the outer ends of the arms at their upper surfaces forming article holders thereon and deflected laterally outward at their free end portions to facilitate the introduction of the articles, supporting legs for the carrier depending from the arms beneath said holders to directly receive the weight of said articles and formed at their upper ends with reduced studs extending through the arms and said members at the intersection of the members, said studs defining shoulders bearing against the lower surfaces of the arms and upset at their upper ends to form terminal heads bearing against the uppermost of said members at their upper sides clamping the members in engagement with the upper surfaces of the arms, and a suspension device for the holder connected with the arms.

2. As a new article of manufacture, an article carrier including straight resilient sheet metal arms connected with each other to form a frame, pairs of crossed semi-circular resilient sheet metal clamping members carried by the arms to form article holders thereon, and a combined leg and fastening device extending through the arms respectively and each pair of said members securing the members fixed upon the arms and extending beneath the arms to cooperate with each other for sustaining the frame.

In testimony whereof I affix my signature.

JACOB BROCKLEY. [L. S.]